United States Patent [19]

Griggs et al.

[11] Patent Number: 5,181,808
[45] Date of Patent: Jan. 26, 1993

[54] METHOD AND APPARATUS FOR AUTOMATED DRILLING HOLE PATTERNS IN ELONGATED WORKPIECES

[75] Inventors: R. Lamar Griggs, Acworth; Norman E. Hatton, Marietta, both of Ga.

[73] Assignee: Lockheed Corporation, Calabasas, Calif.

[21] Appl. No.: 761,583

[22] Filed: Sep. 18, 1991

[51] Int. Cl.⁵ .................................. B23B 35/00
[52] U.S. Cl. ..................... 408/1 R; 408/3; 408/70
[58] Field of Search .............. 408/1 R, 3, 13, 69, 408/70, 71, 89, 91

[56] References Cited

FOREIGN PATENT DOCUMENTS

| 152511 | 11/1981 | Japan | 408/1 R |
| 149109 | 2/1982 | Japan | 408/3 |
| 107814 | 6/1984 | Japan | 408/1 R |
| 56850 | 4/1985 | Japan | 408/37 |
| 216607 | 9/1988 | Japan | 408/3 |

*Primary Examiner*—Daniel W. Howell
*Attorney, Agent, or Firm*—Eric R. Katz

[57] ABSTRACT

A computerized apparatus and method for drilling holes in elongated workpieces. Predetermined locations for holes are input into a computer by visually aligning hole locations on a template with the drilling axis of the apparatus. The computer controls movement of the drill and of the ring segment relative to the drill. The workpiece is moved relative to the drill and is stopped at each predetermined location for drilling.

5 Claims, 6 Drawing Sheets

METHOD AND APPARATUS FOR AUTOMATED DRILLING HOLE PATTERNS IN ELONGATED WORKPIECES

TECHNICAL FIELD

The present invention generally relates to a method and apparatus for accurately drilling sets of holes, each having a given hole pattern, in straight and curved elongated workpieces of various cross-sectional shapes and configurations, and more particularly, to such a method and apparatus wherein the accurate placement of a hole pattern, relative to other hole patterns, is reliably assured.

BACKGROUND ART

An aircraft fuselage is normally formed by a skeletal frame comprised of elongated frame members including a plurality of curved ribs, formed from ring segments, and a plurality of longerons, formed of substantially straight struts which extent along the longitudinal axis of the fuselage and secure the ribs one to one another. These elongated frame member can have a variety of cross-sectional shapes and configurations, as shown in FIGS. 1A–1G. A skin of aluminum or other sheet material is then attached to the assembled skeletal frame by riveting the skin to an outer radial surface of ring segments forming each rib as well as an outer surface of the longerons connecting the ribs.

To facilitate riveting of the skin to the skeletal frame, sets of pilot holes, each comprising a row of holes having a given arrangement and spacing, are drilled in accordance with a precise predetermined hole pattern. The row of pilot holes extend along the longitudinal axis of the elongated frame member and are provided at the outer surface thereof. Thereafter, the skeletal frame is assembled, the pilot holes are back drilled to size and rivets or other suitable fasteners are passed through the skin and into the holes formed in the frame members to secured the skin to the skeletal frame.

Due to the stresses encountered during the operation of the aircraft, it is necessary that the fuselage have a high degree of strength and structural integrity. This strength is provided by attaching the aircraft skin to the skeletal frame of the fuselage utilizing as many fasteners as possible in close proximity to one another. As a result, each skeletal frame member is typically provided with more than one set or row of holes, each row of holes being arranged relative to one another so as to preferable form a regular pattern of orthogonal rows and columns. In this regard, each set of holes provided in a given frame member need not have the same hole pattern, however, a predetermined relationship between each set of holes does exist, the tolerances of which are extremely small.

Typically, a large aircraft fuselage requires over a hundred ring segments and struts, each ring segment being between five and twenty feet in length and having up to four rows with two hundred holes per row. Also, because aircraft fuselages have a variable geometry from front to rear, the ribs of the fuselage frame are often constructed using ring segments of different sizes, i.e., the ring segments forming each rib of the fuselage frame can have different radius of curvature.

Due to the large number of holes required to attach the skin to the skeletal frame of the fuselage, such construction is presently very labor intensive. In addition, it is also very important that the spacing between the holes and the linear uniformity of such spacing be extremely precise because the improper placement of a single pilot hole can result in the scrapping of an entire workpiece in which many man hours of labor have been invested.

A system is known for drilling sets of pilot holes in the ring segments and struts forming the fuselage frame. This system employs a template, which is properly located and secured to the upper outer surface of the workpiece, the template having a series of notches along one edge which is formed in accordance with the predetermined hole pattern to be drilled. A drilling arrangement, employing a pneumatic drill positioned adjacent to a carriage or track which supports the template and workpiece combination, has an locating arrangement (spring biased tooth or the like) for engaging the notches of the template and for properly positioning the drill related to the workpiece so that each of the pilot holes is drilled at the intended drill site.

In current practice, the operator slides the workpiece/template combination along the carriage until the tooth of the locating arrangement engages one of the notches provided by the template at each of the intended hole sites. The operator then presses a trigger mechanism which causes the drill bit to extend to drill the pilot hole. This operation is repeated until all the pilot holes of the hole set have been drilled.

Best results are obtained by the operator developing a rhythm when sliding the workpiece along the carriage. Inaccuracies can develop because of wearing of the template over time, i.e, the engagement of the tooth into the notch can deform the notch which results in undesirable play and inaccurate placement of the pilot holes. Worn templates must then be replaced at significant expense.

Additionally, the quality of the results obtained with the above-noted system is very dependent upon the skill of the operator. The slightest bounce or wiggle can result in a hole being drilled where it should not be. Also, because only one horizontal row can be drilled per pass, the height of the drill must be adjusted and the process repeated for each row in order to drill multiple rows. This, more often than not, results in columns of holes which are irregular and not aligned, i.e., non-orthogonal. Beyond the inherent inaccuracies of this method, it is also a monotonous procedure, resulting in inattention by the operation which leads to a large number of scrap parts and a further lowering of productivity.

SUMMARY OF THE INVENTION

Accordingly, one object of the present invention is to solve the above-described problems by providing both a method and apparatus for accurately drilling sets of holes, each having a given hole pattern, in straight and curved elongated workpieces of various cross-sectional shapes and configurations.

Another object of the present invention is to provide a method and apparatus for drilling holes in an elongated workpiece wherein the accurate placement of a hole pattern, relative to other hole patterns, is reliably assured.

A further object of the present invention is to provide a method and apparatus for drilling sets of holes which reliable reduces scrape pieces and increase productivity.

One particularly advantageous feature of preferred embodiments of the present invention is the ability use pre-existing templates of the prior art system to input the hole locations of the each of the hole patterns current used to construct an airframe in production. This feature greatly reduces the cost of programming the apparatus by eliminating the laborious task of programming and inputting each hole pattern from scratch.

These and other advantages, features, and objects of the present invention are achieved, in accordance with preferred embodiments thereof, by an apparatus for drilling holes in an elongated workpiece having both a longitudinal axis and a traverse axis. The apparatus includes a drill positioned for drilling holes in an exterior surface of the elongated workpiece, the drill having an actuator for extending and retracting a drill bit. Also included is a positioning arrangement for positioning the elongated workpiece, relative to the drill bit, at a predetermined position along the longitudinal axis of the elongated workpiece. A memory for storing a hole pattern, comprising a plurality of predetermined hole positions along the longitudinal axis of the elongated workpiece, is provided along with an input arrangement for entering the hole pattern into the memory, the input arrangement including a visual gage for aligning a drilling axis of the drill bit with a hole site of a given hole pattern marked on a template affixed to the positioning arrangement. Further included is a controller for controlling operation of the positioning arrangement and the actuator of the drill so that holes are drilled in the exterior surface of the elongated workpiece at predetermined hole positions along the longitudinal axis thereof in accordance with the hole pattern stored in the memory.

The present invention also relates to a method of storing a predetermined hole pattern to be drilled by an apparatus for drilling holes in an elongated workpiece. According to preferred embodiments of the present invention, the method comprises the steps of: affixing a template, having markings indicating each hole sites of a given hole pattern, to a workpiece holder for supporting an elongated workpiece for movement relative to a drill having a drilling axis; moving the workpiece holder relative to the drill; visually aligning each hole site marked on the template with the drilling axis of the drill; and storing the position of the workpiece holder at each hole site in a memory of the apparatus.

The present invention further relates to a method of drilling a predetermined hole pattern in an elongated workpiece. According to preferred embodiments of the present invention, the drilling method comprises affixing a template, having markings indicating each hole sites of a given hole pattern, to a workpiece holder for supporting the elongated workpiece for movement relative to a drill having a drilling axis. The workpiece holder/template combination is moved relative to the drill until each hole site marked on the template is adjacent to the drill. The hole site marked on the template is then visually aligned with the drilling axis of the drill and the position of the workpiece holder at each hole site is stored in a memory. The template is then removed and a workpiece is affixed to the workpiece holder. Under control of a controller, for controlling the position of the workpiece holder and the actuation of the drill, the hole pattern stored in the memory is drilling into the elongated workpiece by moving the workpiece holder, relative to the drill, to each of the positions stored in the memory and actuating the drill when the workpiece holder is positioned at a hole position stored in the memory.

Other objects, features, and advantages of the present invention will become apparent upon reading the following detailed description of an embodiment of the invention, when taken in conjunction with the accompanying drawings and the appended claims.

DETAILED DESCRIPTION OF THE PREFERRED EMBODIMENTS

Figure 1A:
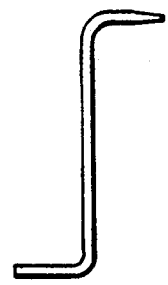
FIGS. 1A-1G illustrate variety of cross-sectional shapes and configuration of the frame members used to construct the skeletal frame of an aircraft fuselage which can be drill by the apparatus of the present invention.
Figure 1B:
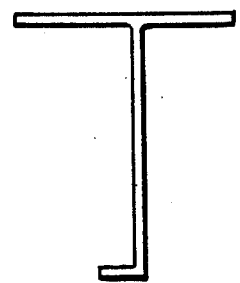
Figure 1C:
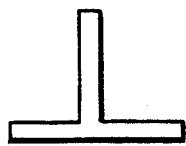
Figure 1D:
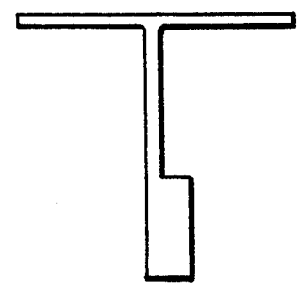
Figure 1E:
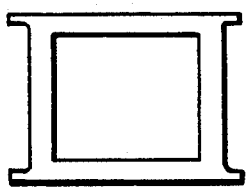
Figure 1F:
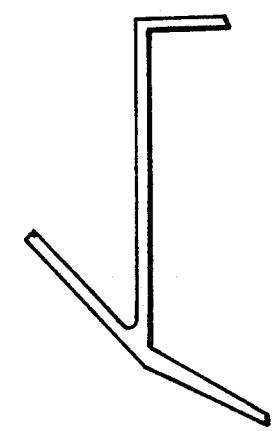
Figure 1G:
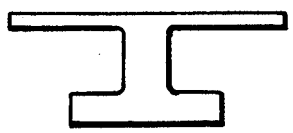
Figure 2:
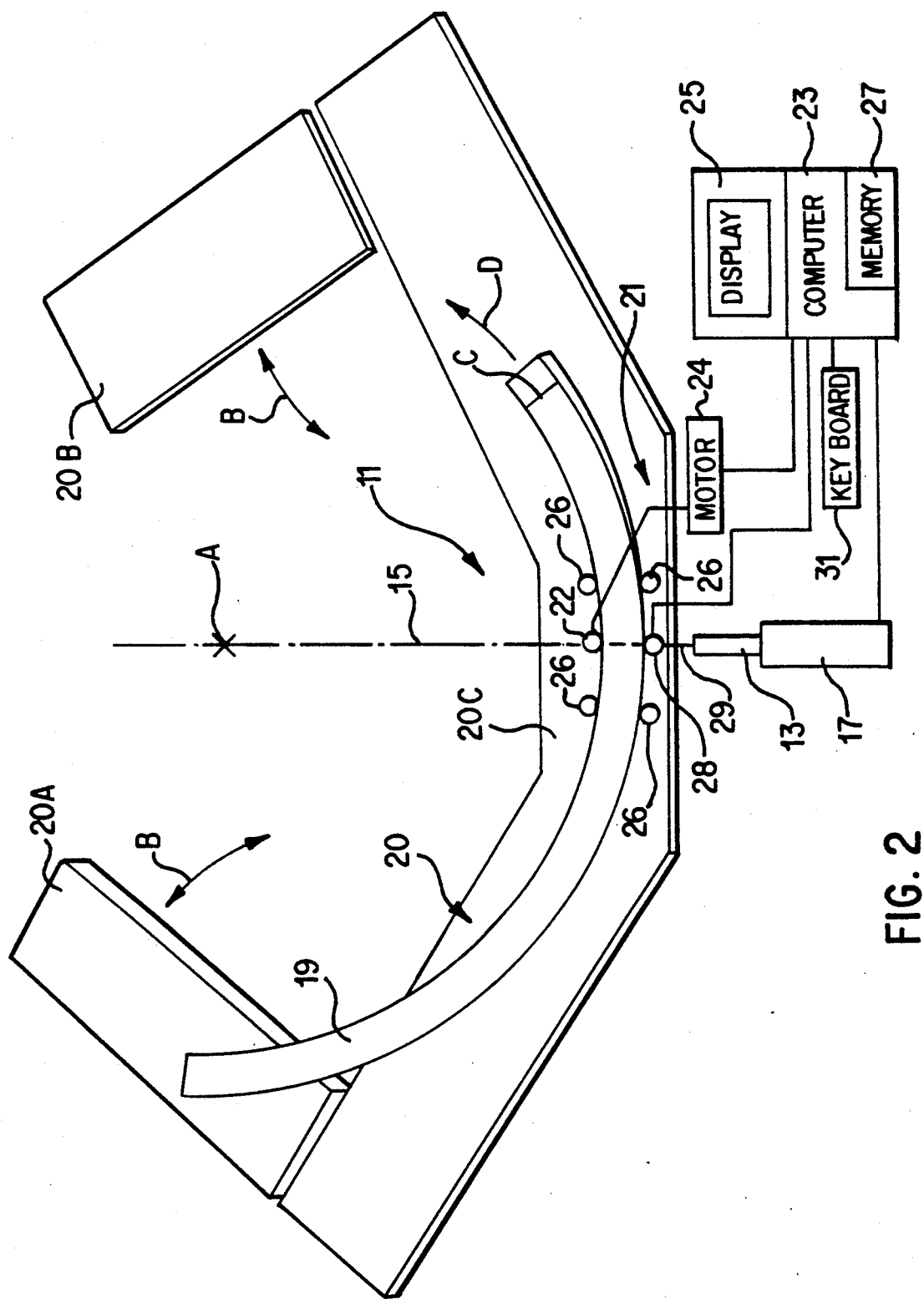
FIG. 2 is a schematic diagram showing a top plan view of a preferred embodiment of the drill apparatus in accordance with the present invention.

Referring now to the drawings in which like numerals represent like parts throughout the several views, FIG. 2 is a top planar view schematically illustrating one embodiment of a drilling apparatus, generally indicated at 11, in accordance with the present invention. The apparatus 11 includes a drill 13, for example a pneumatic motor drill, adapted to rotate a drill bit (not shown) having a drill center line or a drilling axis 15, the drill 13 including an actuator 17 for extending and retracting the drill bit so as to drill a pilot hole in an outer surface of an elongated workpiece (not shown) positioned adjacent the drill 13.

The apparatus 11 further includes a carriage 19 and work table, generally indicated at 20, the carriage 19 being adapted to support a template or the elongated workpiece for movement relative to the drill 19. In the embodiment of FIG. 2, the carriage 19 is curved so as to support a ring segment for forming a curved rib on the fuselage frame. The carriage 19 preferably has a radius of curvature substantially equal of the radius of curvature of the workpiece to be supported thereby, the center of the radius of curvature of the workpiece being designated at A. Because ring segments of different radius of curvature are to be drilled by apparatus 11, carriages of corresponding different radius of curvatures are required. Further, it is preferred that the drilling axis 15 of the drill 13 pass through the center of curvature A of the workpiece so that the pilot holes is formed normal to the surface of the workpiece. The work table 20 is provided with leaves 20A and 20B which are pivotally moveable relative to central section 20C in the direction of arrows B so as to accommodate carriages of different radii. Of course, when a straight strut is to be drilled, the carriage 19 is also straight.

A carriage positioning arrangement, generally indicated at 21, is also provided for moving and positioning the carriage 19 so that the elongated workpiece, when attached to the carriage 19, is positioned relative to the drill bit at a predetermined position along the longitudinal axis of the elongated workpiece. As will be more fully described below, the positioning arrangement includes a drive wheel 22, preferably driven by a stepper motor 24, for engaging and moving the carriage 19 in for example the direction of arrow D, a set of guide rollers or guide wheels 26 for guiding the carriage 19 and a carriage encoder 28 of accurately measuring the distances travelled by the carriage 19 in the direction of arrow D from a longitudinal reference or zero point C from which the longitudinal locations of each of the pilot holes of the hole pattern to be drilled are measured.

A computer 23 is also provided which receives information from the encoder 28 and controls the operation of the drill 13, actuator 17 and carriage positioning arrangement 21. The computer 23 includes display 25 and a memory 27 for storing a hole pattern comprising a plurality of predetermined hole positions along the longitudinal axis of the elongated workpiece. In operation, the computer 23 controls the position of the carriage 19 and the actuator 17 of the drill 13 so that holes are drilled in the exterior surface of the elongated workpiece, along the longitudinal axis thereof, at the predetermined hole positions as set forth by the hole pattern stored in the memory 27.

The drilling apparatus 11 is further provided with an input arrangement for entering the hole pattern into the memory 27. The input arrangement includes a visual gage 29 for aligning the drilling axis 15 of the drill bit with a hole site of a given hole pattern marked on a template or the like when affixed to the carriage 19 and a key board 31 connected to the computer 23 for commanding the input of the longitudinal position of carriage 19, as indicated by the encoder 28, into the memory 27 when the visual gage 29 is aligned, by the operator, with an intended holes site of a hole pattern marked on a template attached and located on the carriage 19 as will be more fully described hereinafter.

DRILLING ARRANGEMENT

Figure 3:
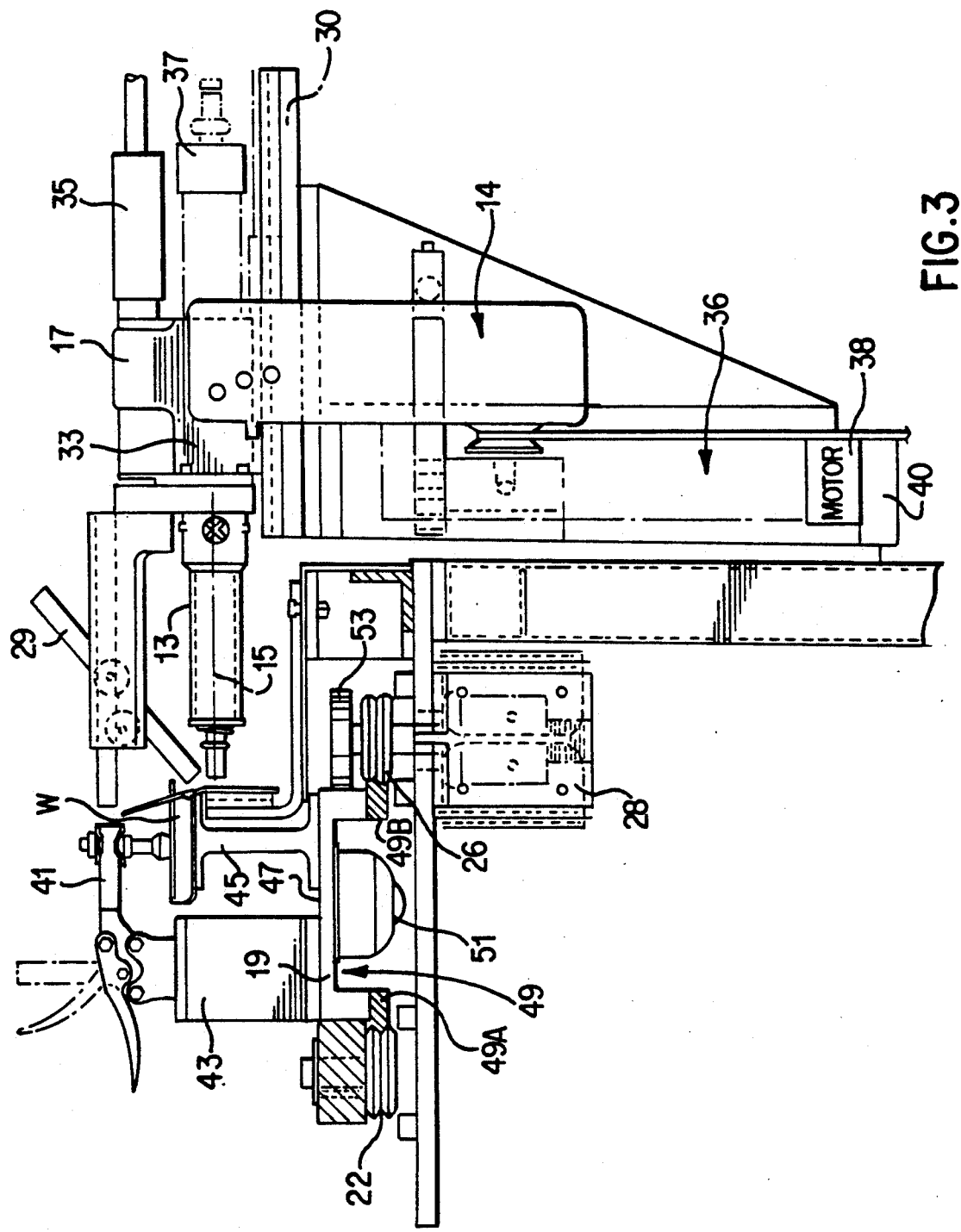
FIG. 3 is a side elevation view, partially in section, of the apparatus of FIG. 2 at the drill.

FIG. 3 is a side view, partially in section, of the apparatus 11 at the drill 13 and drill actuator 17. The drill 13 and actuator 17 are preferably mounted on a platform 30 of a vertically adjustable drill stand 14 positioned adjacent to the workpiece W. The drill 13 preferably is a pneumatic reciprocating type as is commonly used in metal fabrication and the actuator 17 includes, for example, a drill motor 33 for driving the drill 13, a reciprocating piston 35 for moving the drill bit of the drill 13 toward and away from the workpiece W, and an air or fluid routing block 37 for controllably providing a presurized fluid to the drill motor 33 and piston 35.

The drill stand 14 is raised or lowered under the control of the computer 23 so as position the drill 13 at a desired vertical location relative to the location of the workpiece W on the carriage 19. The drill stand 14 includes a rail table 36, such as is available from Daedal Mfg. Co. of Harrison City, Pa., having a stepper motor 38 and an encoder 40. The stepper motor 38 operates under control of the computer to cause vertical movement of the platform 30 along the rail table 3 such that the vertical position of the drill 13 is adjusted to a desired position. The encoder 40 measures vertical movement of the platform 30 along the rail table 36 and sends position signals to the computer 23 corresponding to the vertical position of the platform 30. Fluid pressure for operation of the drill actuator 17 is supplied by air lines (not shown) which extend from the routing block 37 to a source of pressurized fluid (not shown). A drilling cycle includes the steps of providing fluid pressure from the pressure source to activate the drill motor 33 to initiate a spinning action of the drill 13. The routing block 37 routes the pressurized fluid to the drill motor 33 and the reciprocating piston 35 which results in a slow extension of the drill 13 such that a hole is drilled into the workpiece W. When the drill 13 has reached its maximum stroke it quickly retracts in response to a loss of air pressure and stops spinning upon reaching its fully retracted position.

Positioned above the drill 13 is the visual gage 29 used to align the drill 13 with the intended hole sites of a hole pattern delineated by a template properly located and attached to the carriage 19. The visual gage 29 is aligned with the drilling axis 15 of the drill 13 and preferably pivotally mounted so that the gage 29 can be rotated up and out of the way of the drill 13 when not in use.

CARRIAGE

Figure 4:
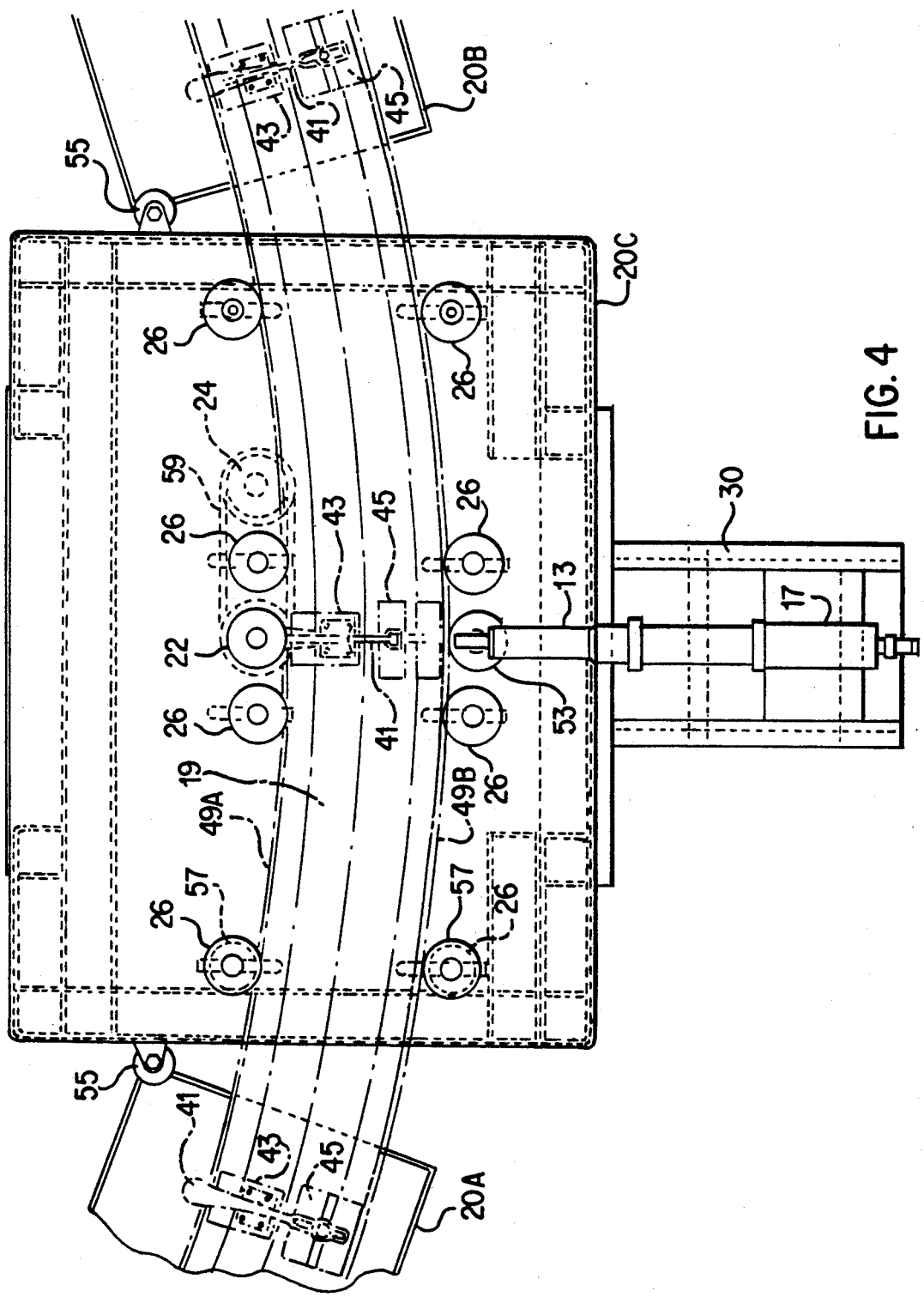
FIG. 4 is a top plan view showing details of the carriage and drill assembly of the preferred embodiment of the apparatus of FIG. 2.

As seen in FIGS. 3 and 4, workpiece W is secured by clamps 41 to the carriage 19. The vertical position of the clamps 41 is varied by the provision of replaceable support blocks 43, positioned at each clamping site, so as to permit accommodation of workpieces having different cross-sectional sizes and configurations. Also included at each clamp site is a replaceable workpiece support block 45 for supporting the workpiece W and for setting the vertical position of the workpiece relative W to the carriage surface 47 also to permit accommodation of workpieces having different cross-sectional sizes and configurations.

The carriage surface 47 is supported by a guide section 49, having a U-shape cross-section, each leg 49A, 49B of the guide section 49 being provided for engaging the guide rollers 26, drive wheel 22 and a measuring wheel 53 (see FIG. 4) of the carriage encoder 28. Attached to the underside of the carriage 19 is a ball bearing support 51 which supports the carriage 19 at the leaves 20A, 20B of the work table 20 and permits the carriage 19 to move easily over these leaves 20A, 20B. However, at the drill 13, the carriage 19 is supported solely by the guide rollers 26 and not the surface of the work table 20, so as to accurately position the carriage 19 vertically relative to the drill 13 and obtain a high degree of accuracy during drilling of the pilot holes.

CARRIAGE POSITIONING ARRANGEMENT

As can best be seen in FIG. 4, the pair of leaves 20A, 20B of the work table 20 are each connected to the central section 20C by a hinge 55 or other suitable arrangement so as vary the configuration of the work table 20 to support carriages of different shapes. In this regard, the leaves 20A, 20B need not only be hinged to the central section 20C but can also be movably positioned along the length of the central section 20C. The carriage 19, to which the workpiece W is secured by clamps 41, is guided to the drill 13 at the central section 20C by the guide rollers 26 having slots 57 (shown in phantom) which engage the ridges 49A or 49B of the guide section 49 so as to support the carriage 19 at the drill 13.

The guide section 49 is advanced by the drive wheel 22, for example a rubber friction drive wheel, the drive wheel 22 being linked by, for example, a drive belt 59, to the drive motor 24, preferably a stepper motor (shown in phantom), located beneath the central section 20C. The drive motor 24 is controlled by signals from the computer 23. Movement of the guide section 49 of the carriage 19, relative to the drill 13, is measured by the measuring wheel 53 which is in frictional contact with, for example, the outer face of the carriage 19 as best seen in FIG. 3, this outer face having the same critical radius as the workpiece W. Rotation of the measuring- wheel 53, corresponding to the movement of the guide section 49, is measured by a carriage encoder 28. The encoder 28 then transmits electrical signals corresponding to the movement of the guide section 49 of the carriage 19 to the computer 23.

COMPUTER/CONTROLLER

As shown in FIG. 2, the computer 23, for example an IBM-compatible personal computer having a keyboard 31 for entering commands and information, is connected to the drill actuator 17, drive motor 24 and carriage encoder 28 by interconnect wiring. The interconnect wiring routes electrical signals to and from the computer 23 and these components via, for example, a motor driver/control system (not shown) and a digital analog-input/output system (not shown). The motor driver/control system powers the stepper motors 24 and 38, monitors the encoders 28 and 40 and relays motor commands from the computer to the motors 24 and 38. The motor driver/control system is preferably of a type readily available from the motor manufacturer, such as, for example, a computer card system. The digital/analog-input/output system is preferably of a type well known in the art for enabling a computer 23 to sense whether level of various input analog electrical signals.

DRILLING OPERATION

Figure 5:
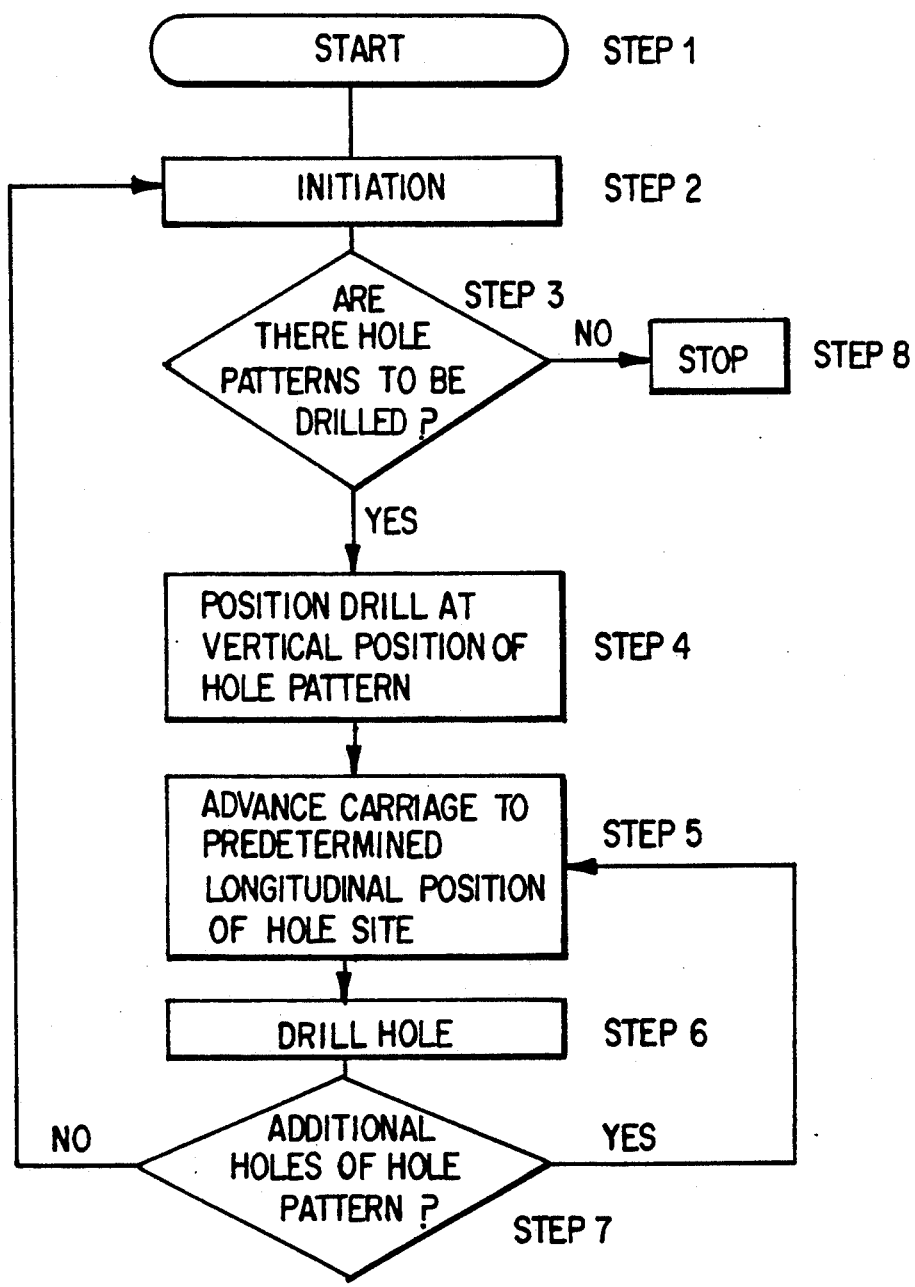
FIG. 5 is a flow chart diagram illustrating the steps employed by one embodiment of the drilling method of the present invention.

FIG. 5 shows a flow chart of the steps which result in a finished workpiece having holes drilled at predetermined longitudinal and vertical positions of a workpiece. In preparation for the drilling operation, in step 1 the workpiece W is clamped to the carriage 19 using the clamps 41 and workpiece support blocks 45 such that workpiece W is positioned at a vertical reference point, for example, the vertical midpoint of the side of the workpiece W to be drilled is aligned with the drill centerline 15. Additionally, during the clamping procedure, one end of the workpiece W is located at the longitudinal reference point C of carriage 19 from which each of the hole positions of the hole patterns is measured. It should be noted that during step 1, both the drill 13 and carriage 19 are positioned at their zero reference locations.

For now it is assumed that the hole locations of each of the hole patterns to be drilled in the workpiece are already stored within the computer 23. However, the steps of inputting the hole positions of the various hole patterns will be discussed more fully below and comprise and inventive aspect of the present invention.

In step 2, the computer 23 is initially informed, for example, via a computer interface such as the keyboard 31, that the work piece W is attached to the carriage 19 which is positioned at zero longitudinal location or reference position, and the drill is positioned at its zero vertical location. It should be noted that each of the zero reference positions are arbitrary reference points normally chosen during input of the hole patterns.

The computer 23 then, in step 3, determines if a hole pattern is to be drilled in the workpiece W. If the answer is yes the computer 23, in step 4, positions the drill 13 at the vertical location of the hole sites of a given hole pattern to be drilled. This positioning is achieved as the computer 23 compares the vertical location of the drill 13 to the vertical location of the hole sites of the given hole pattern to be drilled and generates a signal to turn on power to the stepper motor 38 to raise or lower the drill stand 14 (and hence the drill 13) in the direction of the vertical coordinate of the hole sites of the given hole pattern.

During step 4, the encoder 40 measures the vertical movement of the drill 13 and relays signals corresponding to the location of the drill 13 to the computer 23 which compares the location of the drill 13 to the predetermined vertical coordinate at the given hole pattern. Once the drill 13 is properly positioned in the vertical direction, power to the motor 38 is cut off and the vertical position of the drill 13 remains unchanged during the drilling of each of the holes of the given hole pattern. In this way, each hole of the given hole pattern is accurately provided with the same vertical position.

Thereafter, in step 5, the computer 23 determines the longitudinal position of the nearest hole site, adjacent to the current position of the carriage 19 in the direction D (FIG. 2), to be drilling in accordance with the given hole pattern and activates the drive motor 24 to rotate the drive wheel 22. In response,.the carriage 19, to which the workpiece W is attached and located, is advanced in the direction D.

The carriage encoder 28 measures the advancement of the carriage 19 from its current longitudinal reference position and the computer 23 compares electronic signals representing the changing position of the carriage 19 from its reference position relative to the values of the predetermined positions of the hole sites of the hole pattern to be drilled at the vertical position at which the drill 13 is set. When the carriage 19 arrives at a predetermined longitudinal hole position, the computer 23 generates a signal to turn off power to the drive motor 24 and halt advancement of the carriage 19.

Once advancement of the carriage 19 is stopped, the computer 23 issues, in step 6, a command to the actuator 17 such that the drilling cycle, as explained above, is initiated and a hole is drilled.

After a hole is drilled for a particular longitudinal coordinate, the computer 23 determines, in step 7, whether additional longitudinal hole sites exist where holes are to be drilled in accordance with the given hole pattern. If additional holes are to be drilled, the operation proceeds back to step 5 and the computer determines the predetermined longitudinal position of the next hole site of the hole pattern, in comparison with the current position of the carriage 19, and advances the carriage 19 accordingly. Since the predetermined longitudinal hole positions of the given hole pattern share a common vertical coordinate, the vertical position of the drill 13 does not change during the drilling of the given hole pattern.

If additional holes are not to be drilled, the carriage 19 and drill stand 13 are returned to there initial reference positions in step 2. The positioning and drilling steps are then repeated for the next hole pattern to be drilled at a different vertical position of the workpiece W, each hole pattern not necessarily being the same in form. When no further hole patterns are to be drilled, the operation proceeds to step 8 and the workpiece is removed from the carriage 19.

INPUTTING HOLE PATTERNS

Two methods are available for inputting the hole locations of hole patterns to be drilled in the workpiece in accordance with the present invention. The first method comprises using a master template of the prior art drilling arrangement as a guide for inputting the hole pattern wherein each of the hole positions is marked by a radial line, photographically etched onto the template, the radial line being aligned with the visual gage 29 in order to input, into the memory 27, a carriage location for each of the holes of the hole pattern. Alternatively, each of the hole locations can be manually entering into the memory using numerical values of the coordinates representing the hole locations via a keyboard.

The former method is preferred for aircraft currently under production using the prior art templates because this approach is actually more cost effective than calculating and programming the hole locations from scratch. The latter method is preferred for aircraft which have been designed using a CAD/CAM system wherein hole locations can be down loaded by computer from the CAD/CAM system into the apparatus memory.

Figure 6:
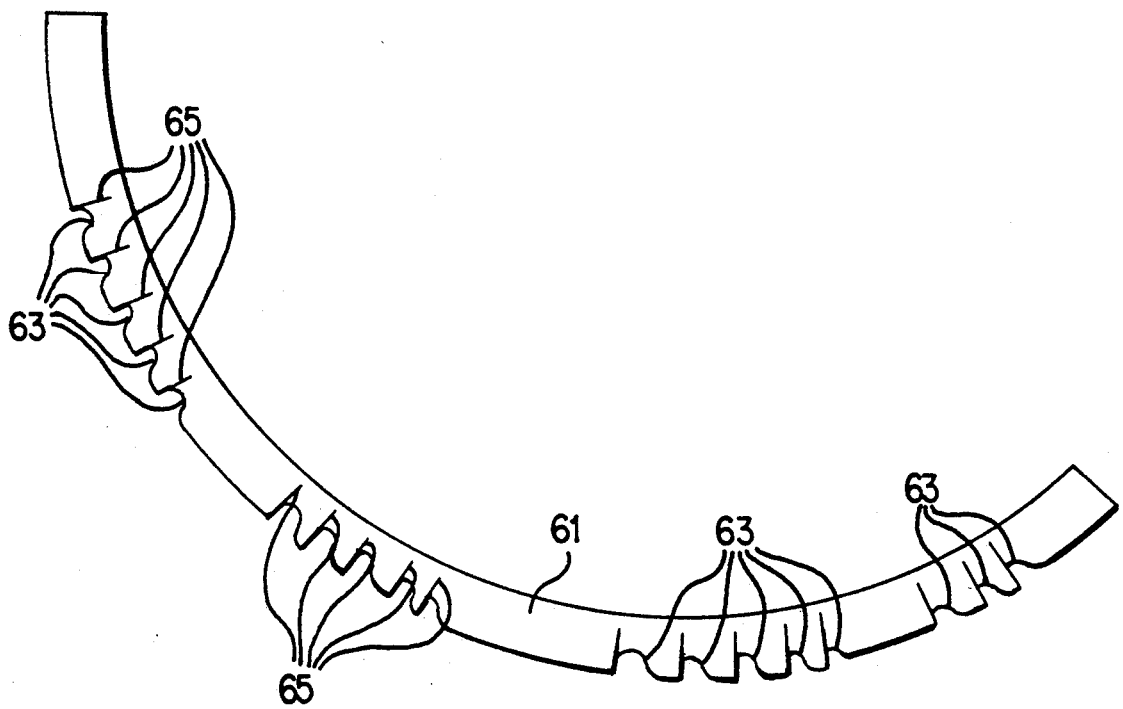
FIG. 6 illustrates a prior art template adapted to be used as a guide for inputting a hole pattern in accordance with one embodiment of the present invention.

Referring to FIG. 6, a template 61 of the prior art arrangement is shown, the template 61 having notches 63 used to trigger the drilling cycle as previously described. Such a template 61 is also usable in the present invention to input hole pattern information for storage within the computer to drill hole patterns in workpieces for which the template was originally designed.

In adapting the template 61 for use with the present invention, a full-sized mylar overlay of the blue print of the workpiece to be drilled is first produced using conventional, well known methods. The mylar overlay is then applied to the template 61 and radial lines 65, marking the exact radial location of each of the holes of the hole pattern delineated by the notches 63, are etched onto the template 61 by, for example, photoetching.

Figure 7:
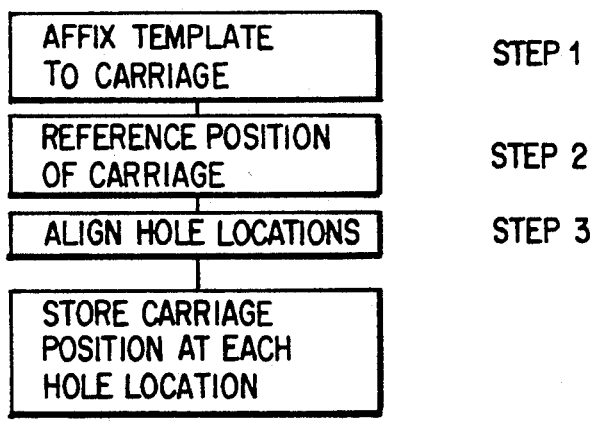
FIG. 7 is a flow chart diagram illustrating the steps employed by one embodiment of the method of storing a drilling pattern in accordance with the present invention.

Referring to FIG. 7, to input the locations where holes are to be drilled in accordance with this embodiment, in step 1, the template 61 is attached to the carriage 19 by clamping or the like. In step 2, the carriage 19 is moved to a longitudinal zero reference position if it does not already occupy this position and the longitudinal zero reference location C of the carriage 19, as indicated by the carriage encoder 28, is inputted into the memory 27 of the computer 23 by means of operator actuation of the keyboard 31. Concurrently, the vertical position of the hole pattern is stored in the memory 27 by having the drill stand 14 moved to the required vertical position, this vertical drill stand information being read off of the blue print and inputted by hand by the operator.

In step 3, the carriage is then moved in direction D until the first radial lines 65 of the hole pattern of the template 61 is aligned with the visual gage 29. This alignment process is performed by the operator visually aligning the radial line 65 with the gage 29 by jogging the carriage 19 by very small increments until each are exactly aligned. Then, in step 4, the carriage location, as indicated by the carriage encoder 28, is inputted into the memory 27 by the operator toggling the keyboard 31 to designate the longitudinal hole position.

This process is repeated for each of the radial lines 65 of the template 61 until all the longitudinal hole positions of the hole pattern are stored in the memory 27. This method is repeated with different elevations of the drill stand 14 when more than one row of holes is required. Further, when more than one type of hole pattern is to be drilled in the workpiece W at different vertical locations of the drill stand 14, different templates are used to input the longitudinal positions of the hole locations at each of the vertical positions of the drill stand 14 in accordance with the above described process.

Alternatively, the locations of the holes may also be input using a digital scanner (not shown) which is triggered when prompted by the radial lines 65 on the template 61. In this approach, the template 61 having a photographically etched design is passed through the apparatus in the same manner as above, but the visual gage 29 is replaced with an optical scanner. This approach, likewise, must be repeated when multiple rows of holes are required.

A further embodiment of the method is to enter into the computer x, y coordinates representing the locations of the holes to be drilled. This may be done using a conventional keyboard to enter information representing the coordinates. The locations of the holes are calculated using the blueprints or from pre-existing templates. This method can also be used to down load CAD/CAM data directly into the memory 27 in one step.

It will be understood that the apparatus of the present invention is also useful for other metal fabrication needs. For example, it is customary to form an airplane fuselage skeletal frame by interconnecting the ribs via longerons to form a framework. To allow this interconnection, it is typical to provide end cuts and cutouts along the inner radial surface of the individual ring segments for accepting the longerons to permit attachment of the ring segments to the longerons. It is current practice to provide the cutouts and end surfaces by hand using a router. This is done after the holes have been drilled by clamping the ring segment to a work surface, clamping a router guide to the segment, and routing the segment according to the guide. As is apparent, this method is highly dependent upon the skill of the operator, and could be improved utilizing the present invention such that a router is provided to configure the workpiece according to a predetermined pattern.

The foregoing description relates to a preferred embodiment of the present invention, and modifications or alterations may be made without departing from the spirit and scope of the invention as defined in the following claims.

We claim:

1. An apparatus for drilling holes in an elongated workpiece having both a longitudinal axis and a traverse axis, comprising:
    a drill positioned for drilling holes in an exterior surface of the elongated workpiece, the drill having an actuator for extending and retracting a drill bit having a drilling axis;
    positioning means for positioning the elongated workpiece, relative to the drill bit, at a predetermined position along the longitudinal axis of the elongated workpiece; and
    data storage means for storing a hole pattern comprising a plurality of predetermined positions along the longitudinal axis of the elongated workpiece;

input means for entering the hole pattern into said data storage means, the input means including a gage for aligning the drill bit with a hole site of a given hole pattern marked on a template when affixed to the positioning means; and a controller for controlling operation of the positioning means and the actuator of the drill so that holes are drilled in the exterior surface of the elongated workpiece at predetermined positions along the longitudinal axis thereof in accordance with the hole pattern stored in the data storage means.

2. An apparatus according to claim 1, wherein the positioning means includes a measuring means for measuring a longitudinal position of the elongated workpiece relative to the drill bit, a workpiece support for supporting the workpiece for movement relative to the drill and a workpiece support driving means for moving the workpiece support relative to the drill.

3. An apparatus according to claim 2, wherein the measuring means comprises a shaft encoder mounted to a shaft of a rotatable wheel for contacting the workpiece support.

4. An apparatus according to claim 1, wherein the controller comprises:

a programmable computer for comparing the position of the elongated workpiece with the predetermined hole positions of the hole pattern stored by the data storage means;

wherein the programmable computer generates a first command signal when the elongated workpiece is positioned at one of the predetermined hole positions;

wherein the programmable computer generates a second command signal when said member is not positioned at one of the predetermined hole positions;

wherein the actuator is responsive to the first command signal to drill at least one hole in the elongated workpiece when the elongated workpiece is positioned at one of the predetermined positions; and wherein the positioning means is responsive to said second command signal to move the elongated, relative to the drill bit, until the elongated workpiece is positioned at one of the predetermined positions.

5. A method of forming a predetermined hole pattern to be drilled in an elongated workpiece, the method comprising the steps of:

affixing a template, having markings indicating each hole sites of a given hole pattern, to a workpiece holder for supporting an elongated workpiece for movement relative to a drill having a drill bit;

moving the workpiece holder relative to the drill;

visually aligning each hole site marked on the template with the drill bit;

storing the position of the workpiece holder at each hole site in a memory means.

* * * * *